United States Patent Office 3,251,891
Patented May 17, 1966

3,251,891
STABILIZED COMPOSITIONS
Charles L. Cormany, Wadsworth, William R. Dial, Akron, and Blaine O. Pray, Wadsworth, Ohio, assignors to Pittsburgh Plate Glass Company, Pittsburgh, Pa., a corporation of Pennsylvania
No Drawing. Filed Jan. 18, 1962, Ser. No. 167,174
8 Claims. (Cl. 260—652.5)

This application is a continuation-in-part of application Serial No. 712,693, filed February 3, 1958.

This invention relates to the stabilization of methylchloroform. More particularly, it deals with the protection of methylchloroform against decomposition, reduction of its corrosive action, particularly on metals, and avoidance of other such instability as is evidenced by methyl chloroform during its normal use.

Methylchloroform, 1,1,1-trichloroethane, is a normally liquid chlorinated hydrocarbon valuably employed as an industrial solvent for any of a wide number of applications. One principal use is as a liquid phase degreasing solvent. Metal articles are immersed in liquid methylcholorform to remove from the article greases, oils and the like in liquid degreasing. In such usage, methylchloroform evidences a strong tendency to decompose. This decomposition is particularly alarming with light metals such as aluminum, magnesium and their alloys, especially when traces of water are present. Within all too short a period, decomposition occurs to such an extent that the methylchloroform loses its practical value and also may damage the metals being treated.

Another important use for methylchloroform is as a vapor pressure depressant in conjunction with aerosol. It serves to reduce the pressure in a closed metal container of the aerosol. Because of its peculiar nature, methylchloroform corrodes the metal container, especially if water is present. It also decomposes under these conditions of use.

A still further use to which methylchloroform may be put is as a vapor phase degreasing solvent. In this type of degreasing, vaporized methylchloroform contacts metallic articles from which oils, greases and the like are removed. Serious decomposition or other degradation of methylchloroform occurs during vapor degreasing which, unless counteracted or otherwise minimized, is a significant deterrent to its usefulness as an effective vapor degreasing solvent.

These and other problems of stability, including decomposition, corrosiveness and the like, especially those which arise in connection with the industrial uses of methylchloroform are quite serious. Unless they are overcome or substantially minimized, methylchloroform cannot be used with complete effectiveness and efficiency.

Methylchloroform presents its own unique difficulties regarding stabilization. Thus, experiences in the stabilization of other halogenated hydrocarbons are not applicable.

It has now been discovered, in accordance with this invention, that methylchloroform may be stabilized so as to reduce or eliminate, among other things, its corrosiveness, tendency to decompose and the like by incorporating therein a minor concentration, up to about 10 percent by weight thereof, preferably from 0.05 or 0.5 to 5 weight percent, of dioxolane. A typical dioxolane concentration in this preferred range is from 1 to 3 weight percent. By providing a methylchloroform composition containing a stabilizing concentration of dioxolane, its corrosiveness, tendency to decompose and other disadvantages, especially those observed during its use may be obviated or minimized to the extent that they are no longer serious. Methylchloroform stabilized with dioxolane is on enhanced value.

Dioxolane or glycol formal, as it is sometimes called, has the structural formula:

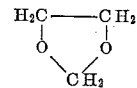

It has further been found particularly that combinations of dioxolane with alcohols, especially monohydric aliphatic alcohols, or organic epoxides—oxirane compounds, those compounds having an oxygen atom linked to two adjacent linked carbon atoms, e.g., the group

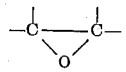

are especially useful in the stabilization of methylchloroform.

Among these alcohols are:

Methanol
Ethanol
Isopropanol
n-Butanol
Propanol

Organic epoxides include:

Ethylene oxide
Propylene oxide
Glycidol
Butylene oxides (each isomer or an isomeric mixture)
Epichlorohydrin
Styrene oxide
Cyclohexene oxide It is to be understood, moreover, that other additives in addition to alcohols and epoxides may be used along with dioxolane according to this invention. For example, nitroalkanes such as nitromethane and nitroethane as well as aliphatic nitriles such as acetonitrile, acrylonitrile, among others, may be incorporated along with dioxolane in methylchloroform.

When compounds besides dioxolane are also employed for stabilizing purposes, the total concentration of these compounds should be between 0.05 and 10 percent, preferably less than 6 percent, by weight of the methylchloroform. The concentration of the individual component in such stabilizing may be varied. Usually, the respective constituents are in equal weight concentrations. However, this is not essential and one constituent may be used in greater concentration.

The following example illustrates the stabilizing effect of dioxolane:

*Example*

The test procedure used to evaluate the stabilizing effect of various compounds in methylchloroform involved placing 50 cubic centimeters of methylchloroform in a 250 cubic centimeter glass flask and thereafter refluxing, under atmospheric conditions, the methylchloroform under total reflux. Small strips of aluminum (½ inch by ½ inch polished aluminum) were included in the bottom of the flask and, hence, immersed in the boiling methylchloroform. The stabilizing compound as indicated in the table was included in the methylchloroform charged to the flask in the concentration indicated in the table. Refluxing was continued until the stabilizing effect of the compound or mixture of compounds was no longer observed as indicated either by the formation of tars, evolution of hydrogen chloride and appearance of precipitates.

Without the use of a stabilizer, methylchloroform in the presence of aluminum strips turned black (indicating undesirable decomposition) after about 5 minutes of refluxing.

The following table lists data of various tests demonstrating the stabilizing effect of dioxolane in methylchloroform:

TABLE

| Stabilizer | | Total Reflux Time Before Decomposition (Hours) |
|---|---|---|
| Name | Concentration, percent by Weight | |
| None | | 0.1 |
| Dioxolane | 3.0 | 140 |
| Dioxolane | 3.0 | 84 |
| Butylene Oxide | 1.0 | |
| Dioxolane | 3.0 | [1] 140 |
| Ethanol | 3.0 | |
| Dioxolane | 3.0 | [1] 140 |
| Isopropanol | 3.0 | |

[1] Testing stopped; no decomposition occurred during this time interval

While the invention has been described with reference to specific details of certain embodiment, it is not intended that it be construed as limited to such details except insofar as they are recited in the appended claims.

We claim:

1. A methylchloroform composition containing a stabilizing concentration of dioxolane.

2. A methylchloroform composition containing a stabilizing concentration of dioxolane and a lower alkanol.

3. A methylchloroform composition containing a stabilizing concentration of dioxolane and an organic epoxide selected from the group consisting of unsubstituted epoxides having up to 8 carbon atoms, glycidol and epichlorohydrin.

4. A stabilized composition consisting of methylchloroform having incorporated therein from 0.5 to 5 percent by weight of 1,3-dioxolane.

5. A stabilized composition consisting of methylchloroform having incorporated therein from 1 to 3 percent by weight of 1,3-dioxolane.

6. Methylchloroform containing a stabilizing concentration of up to 10 percent by weight dioxolane.

7. Methylchloroform containing a stabilizing concentration of dioxolane and butylene oxide.

8. A stabilized methylchloroform composition containing from 0.05 to 10 percent by weight of dioxolane.

References Cited by the Examiner

UNITED STATES PATENTS 3,008,999   11/1961   Kauder _____ 260—652.5

LEON ZITVER, *Primary Examiner.*

ALPHONSO D. SULLIVAN, MILTON STERMAN, *Examiners.*